Patented Jan. 20, 1942

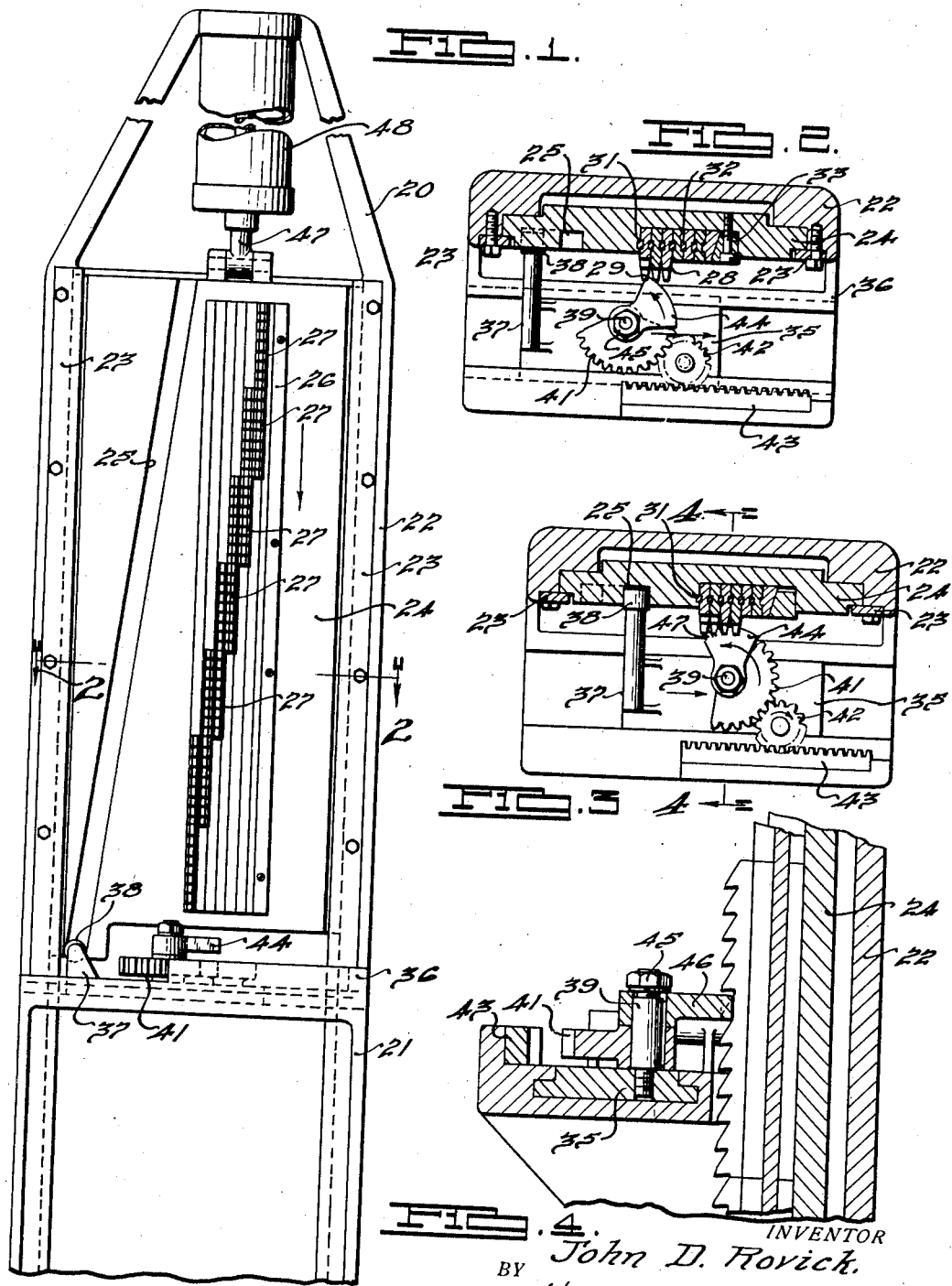

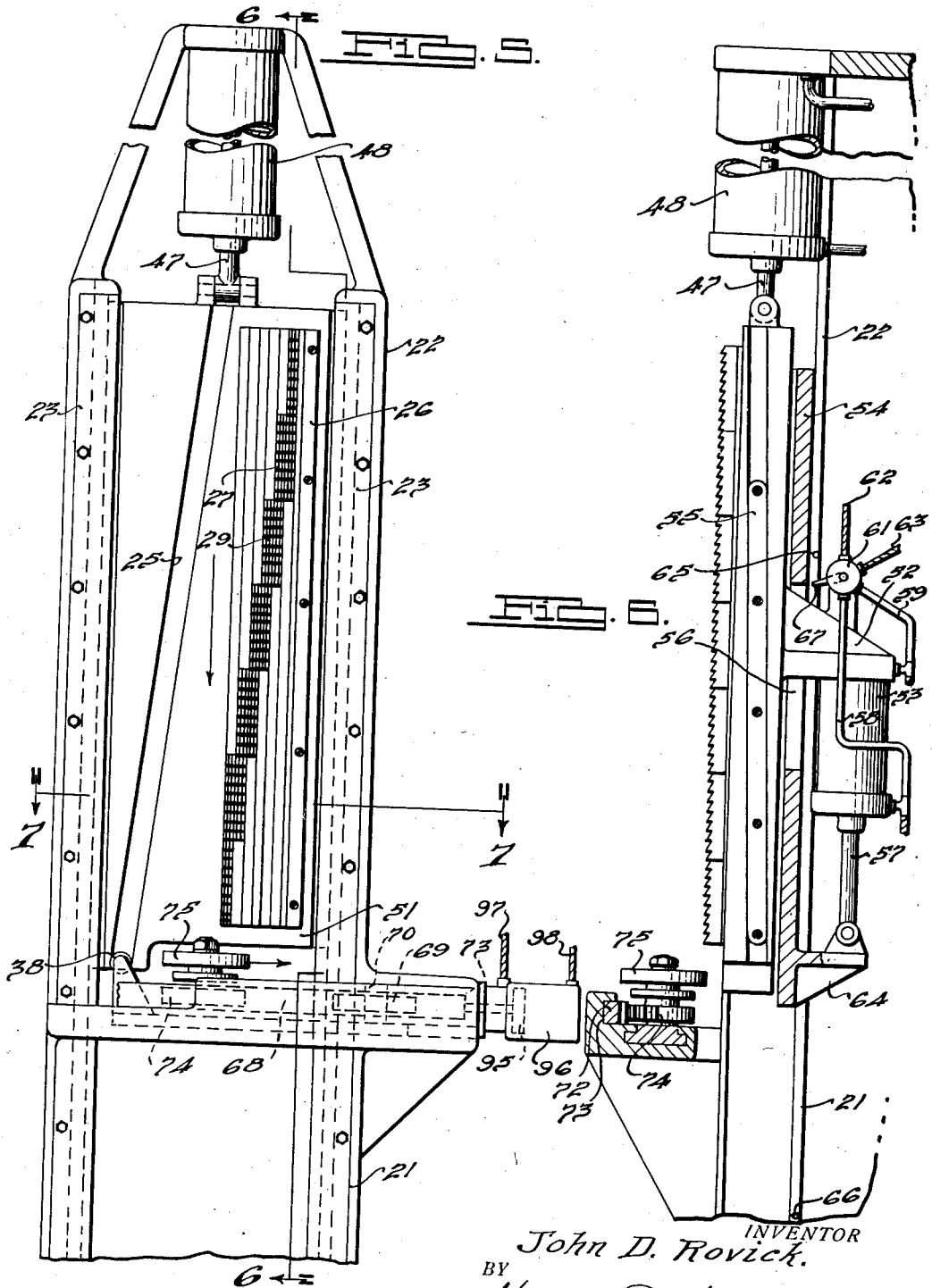

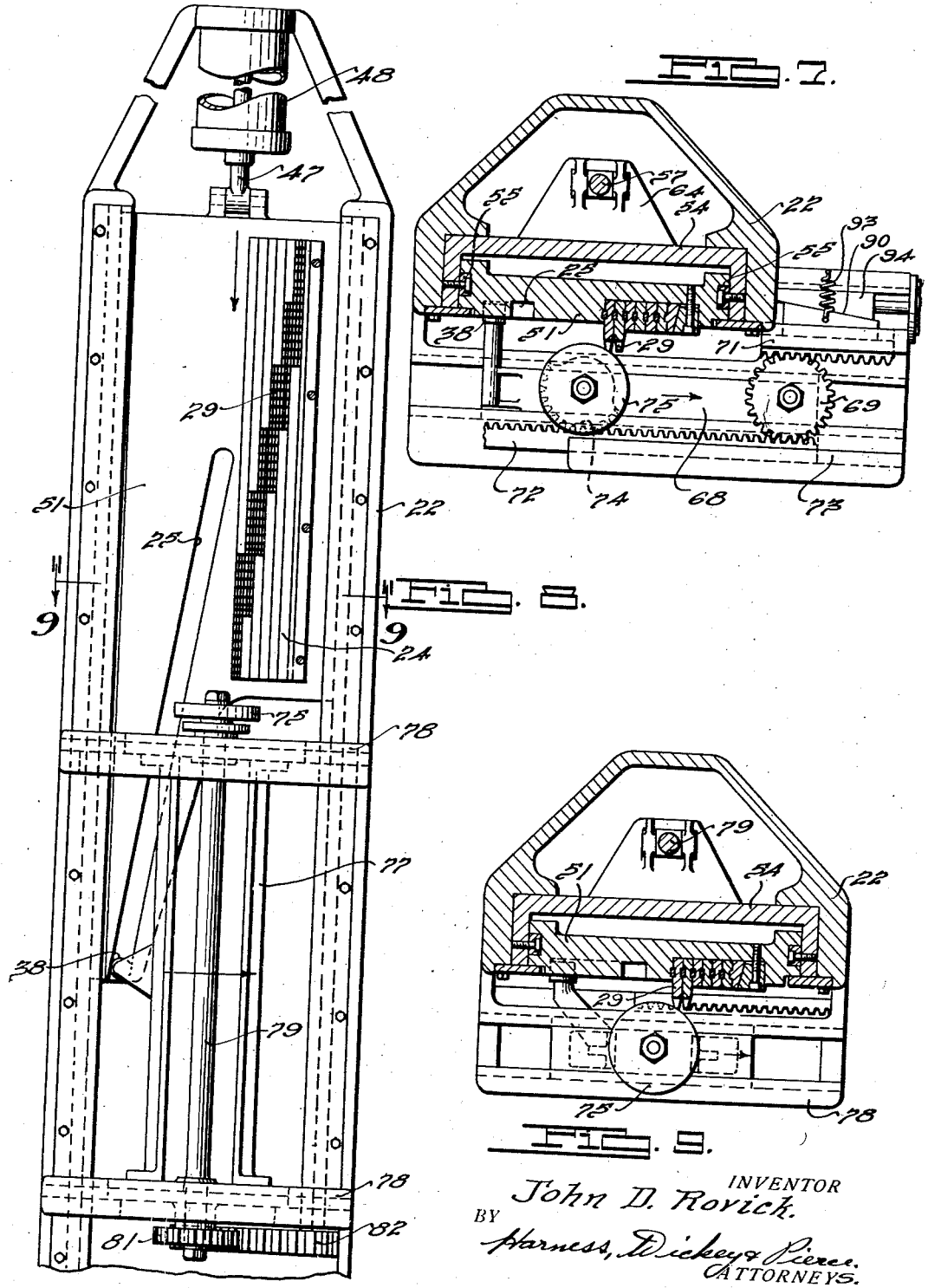

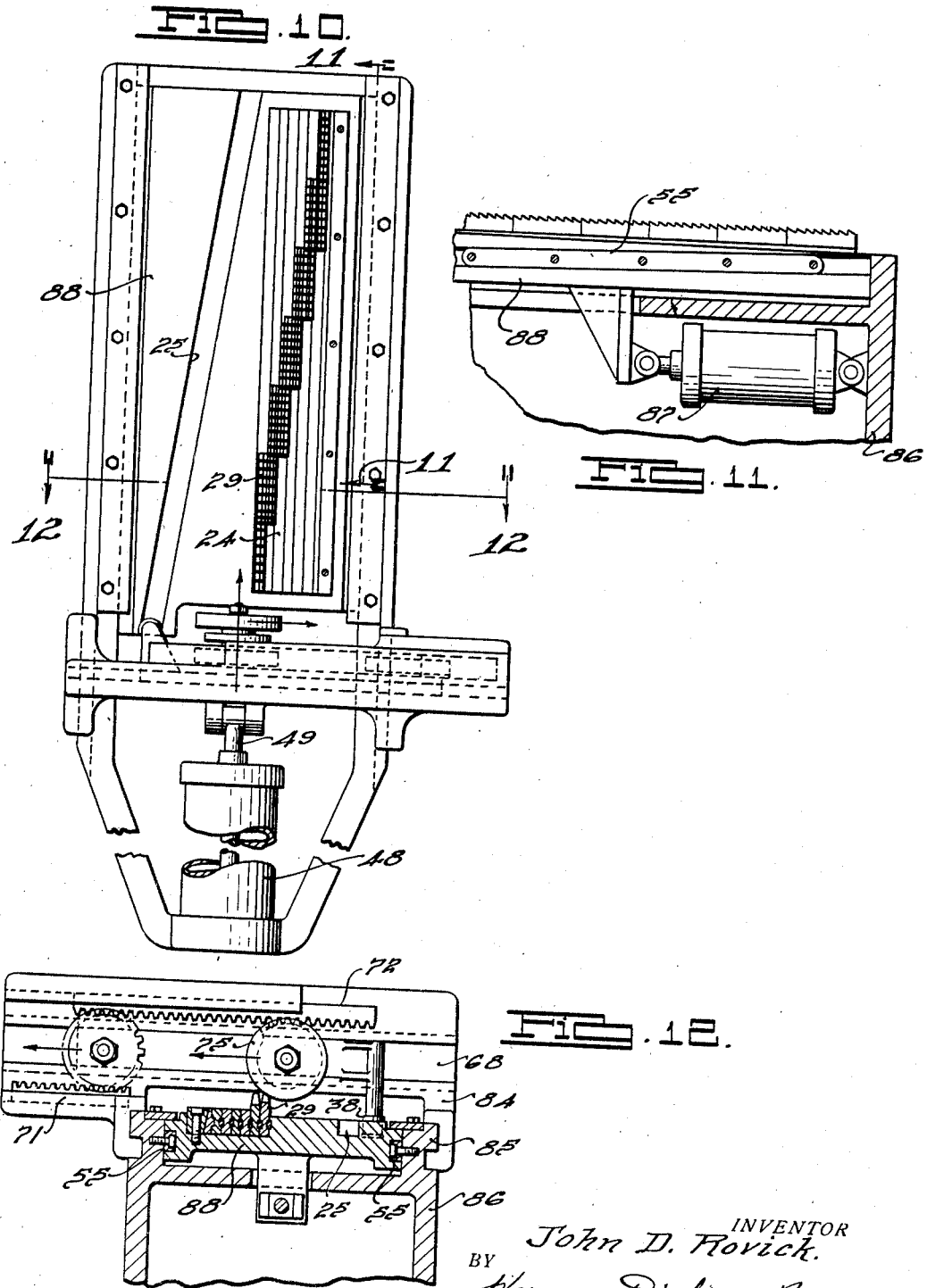

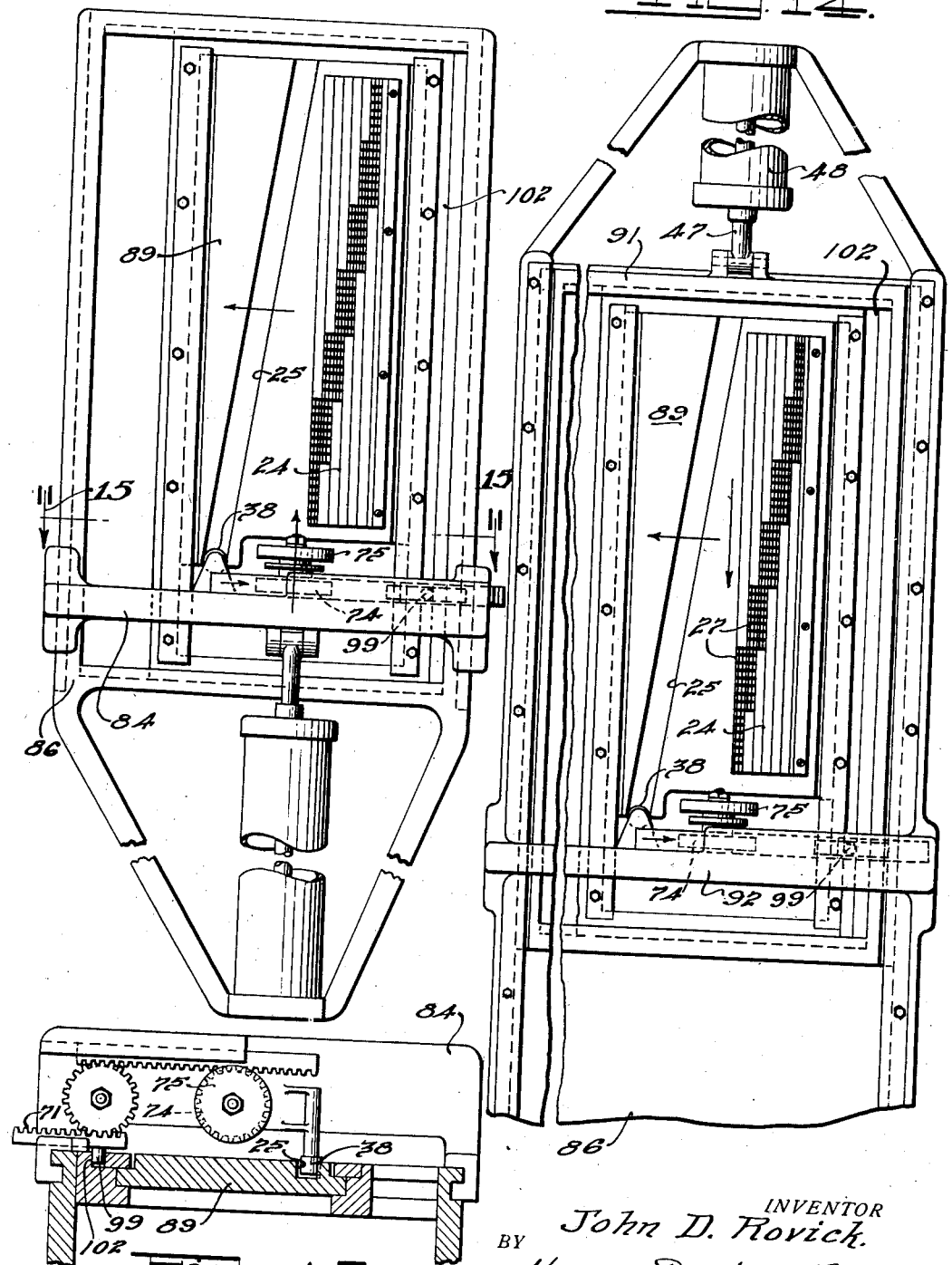

2,270,741

UNITED STATES PATENT OFFICE 2,270,741

MACHINE AND TOOL FOR FINISHING GEARS

John D. Rovick, Detroit, Mich., assignor to Michigan Tool Company, Detroit, Mich., a corporation of Delaware Application April 7, 1938, Serial No. 200,690

6 Claims. (Cl. 90—8)

My invention relates to broaching machines and methods, and particularly to a broaching machine and method for cutting teeth in gears, gear sector blanks, and the like, through a generating operation.

Broaching methods have been proposed heretofore for machining teeth on internal and external gear blanks by means of a standard broaching operation. That is to say, by having the teeth of the broach conform to the shape of the teeth to be produced in the blank, the teeth of the broach being complementary to the teeth thus produced. On internal types of gear blanks the broach was of the solid round type, or the built-up type, and was in some instances entirely annular to completely broach the teeth in one broaching operation. In other instances, the broach was in the shape of sectors, and a relative index movement was provided between the broach and the work between each broaching stroke. Annular types of broaching rings, or broaches in the nature of internal gears were employed for machining teeth on the periphery of gear blanks by forcing the blanks through the broach to have the teeth progressively cut thereon. In all of these instances the teeth of the broach were complementary to the form of tooth to be produced on the gear blank.

In practing my present invention I employ a generating method, in combination with the broach, for producing a desired form of tooth on a gear blank or sector. The teeth of the broach have straight sides which produce involute teeth on the blank as the blank is progressively rolled across the broach teeth during the time the broach teeth are advanced across the periphery of the blank. In view of the advancement of the blank laterally across the broach, the broach is preferably made up of a plurality of sectors disposed in staggered relation to have the axis of the broach diagonally disposed to conform to the resultant movement of the broach and blank. Means are provided for synchronizing the advancement of the blank and the movement of the broach to have the blank and broach positively retained in all positions of movement. Where the blank is a sector, or a small gear, a single stroke of the broach is employed for completing the broaching operation. Where, however, the blank has a large periphery, it is indexed at the end of each stroke of the broach, several of which are required to complete the machining of the gear. The relative movement between the gear and blank may occur by moving the gear only to have it advance laterally and longitudinally across the broach which is retained stationary; the blank may be advanced laterally as the broach is moved across its periphery; the blank may be moved longitudinally as the broach is moved laterally; or the blank may be retained stationary as the broach is moved both laterally and longitudinally thereacross. The resultant of any of these movements produces the generation of the teeth on the periphery of the blank.

Accordingly, the main objects of my invention are; to provide a broach made up of a plurality of sections which are disposed in aligned staggered relation; to mount a gear blank relative to a broach and produce a lateral advancement between the broach and blank as a relative longitudinal movement is provided therebetween; to mount a gear blank relative to a broach and synchronize the movement of the broach with the rolling movement of the blank across the broach teeth to generate an involute form on the blank; to mount a slide for movement laterally across the path of movement of the broach and move the slide in synchronism with the broach and translate such movement of the slide into one of rotation of the blank as it is moved by the slide across the broach teeth as the broach teeth advance across the peripheral edge of the blank; to rotate a gear blank on a slide by a rack and master gears which operate the blank in rotation as the slide is advanced normal to the path of movement of the broach; to mount the gears and racks for operating the blank in rotation below the broach when in its lower position, to continuously roll the blank across the broach to have all the teeth thereof machined in a single operation; to only partially machine the blank during each stroke of the broach and index the blank thereafter; and in general to provide a broach with like teeth and roll a gear blank thereacross in synchronism with the movement of the broach to generate involute teeth therein, all of which is simple in construction, positive in operation and economical of manufacture.

Other objects and features of novelty of my invention will be specifically pointed out or will become apparent when referring, for a better understanding of my invention, to the following description taken in conjunction with the accompanying drawings wherein:

Figure 1 is a view in elevation of a machine for broaching gears through a generating process which embodies features of my invention;

Fig. 2 is a sectional view of the structure illustrated in Fig. 1, taken on the line 2—2 thereof, at the beginning of a broaching operation;

Fig. 3 is a view of the structure illustrated in Fig. 2 near the end of the broaching operation;

Fig. 4 is an enlarged sectional view of the structure illustrated in Fig. 3 taken on the line 4—4 thereof;

Fig. 5 is a view of a structure, similar to that illustrated in Fig. 1, showing a modified form thereof;

Fig. 6 is a sectional view of the structure illustrated in Fig. 5, taken on the line 6—6 thereof;

Fig. 7 is a view of the structure, similar to that illustrated in Figs. 1 and 5, showing a further form which my invention may assume;

Fig. 8 is a sectional view of the structure illustrated in Fig. 7, taken on the line 8—8 thereof;

Fig. 9 is a sectional view of the structure illustrated in Fig. 8, taken on the line 9—9 thereof;

Fig. 10 is a plan view of a broaching device for machining gears by a generating process embodying a further form which my invention may assume;

Fig. 11 is an enlarged sectional view of the structure illustrated in Fig. 10, taken on the line 11—11 thereof;

Fig. 12 is a sectional view of the structure illustrated in Fig. 10, taken on the line 12—12 thereof;

Fig. 13 is a plan view of structure, similar to that illustrated in Fig. 10, showing a further modified form which my invention may assume;

Fig. 14 is a view of structure, similar to that illustrated in Figs. 10 and 13, showing a still further form which my invention may assume; and, Fig. 15 is a sectional view of the structure illustrated in Fig. 13, taken on the line 13—13 thereof.

In Fig. 1, I have illustrated a machine 20 of the vertical type, and it is to be understood that the same principles employed therein may be utilized on a horizontal or other type of machine. The vertical type of machine which is shown in Fig. 1 embodies a base 21 supporting a standard 22 having guideways 23 thereon in which a slide 24 is reciprocable. The slide is provided with a cam groove 25 and a broach 26, the latter of which is of the built-up type comprising a plurality of sections 27, each of which comprises a plurality of blades 28, as illustrated in Figs. 2 and 3, having teeth 29 thereon similar in height and having flat sloping sides. The blades are secured together by bars 31 and filler plates 32 are utilized for positioning the various sections of the broach in eschelon from the lower left to the upper right corner of the broach. Suitable clamping means 33 retain the blades and filler plates 32 in firm fixed relation on the slide 24.

A slide 35 is mounted on the base 21 in ways 36 for movement transversely of the path of movement of the slide 24. An arm 37 projecting from the slide 35 carries a roller 38 which extends into the cam slot 25 of the slide 24. A rotatable shaft 39 is carried by the slide 35 to which a gear sector 41 is secured. A pinion 42 is also rotatably mounted on the slide 35 having its teeth in mesh with the teeth of the sector 41. A rack 43 is secured to the base 21 having its teeth in engagement with the teeth of the pinion 42. In the example illustrated, a gear sector blank 44 is to be machined by the teeth 29 of the broach.

The sector blank is secured to the shaft 39 by suitable means herein illustrated as by a clamping bolt 45, a key 46 retaining the sector blank and sectors 41 in predetermined relation on the shaft. The broach and slide 24 are reciprocated by a piston rod 47 operating within a cylinder 48. A fluid pump and control means (not shown) are provided in the base of the machine in the conventional manner for supplying fluid to the cylinder 48 to move the piston rod 47 and slide 24 downwardly. The downward movement of the slides carries the cam surface 25 downwardly therewith which, acting on the rollers 38, moves the slide 35 laterally. This movement effects the rotation of the gears 42 through its engagement with the teeth of the rack 43 to thereby rotate the gear sector 41, the shaft 39 and the blank 44. As the teeth 29 of the broach 26 move downwardly with the slide 24, the gear sector is moved transversely across the path of the teeth and rotated to produce a relative rolling movement. The blank rolls across the teeth of the broach as the broach moves across the periphery of the blank and teeth of involute form are generated in the periphery of the blank. During the initial movement of the broach the blank is out of contact with the teeth, but immediately thereafter the blank rolls directly into the path of the teeth as the broaching teeth are advanced, as illustrated in Fig. 2. The broaching teeth having straight sloping sides similar to a rack, produce the generation of true involute forms on the blank teeth as they are formed. In view of this rolling-in of the blank with the broach teeth, all of the broach teeth are of the same dimension in width and height as illustrated in Fig. 4, the material being machined from the blank as its periphery is rolled into the path of the teeth. The teeth 47 which are machined on the blank 44 are of the straight spur type, and it is to be understood that when helical teeth are to be provided thereon, the shaft 39 may be disposed at an angle, forming with the broach teeth, substantially the angle of the helix of the teeth of the gear or sector blank. The enter slides 35 may be disposed at an angle to produce the same result when machining helical teeth on a blank.

In Figs. 5, 6, and 7, I have illustrated a further form of broaching machine in which a gear blank is machined by indexing the blank and employing several passes of the broach during the machining operation. Means are provided for moving the broach out of contact with the gear blank so that it may be returned to its initial position without contacting the blank. A slide 51, similar to the slide 24 of the structure illustrated in Figs. 1 to 4, is employed, having a cam slot 25 therein and which supports a broach 26 of the built-up type as described above. The slide 51 has a cylinder bracket 52 projecting rearwardly therefrom from which a cylinder 53 depends. The standard 22 is recessed to receive a slide 54 in which the slide 51 is movable on sloping cam tracks 55. The slide 54 is provided with an opening 56 through which the bracket 52 extends to support the cylinder 53 rearwardly of the slide 54.

A piston rod 57 is operated by fluid delivered to and vented from the cylinder 53 through conduits 58 and 59. The conduits are connected to a valve 61 to and from which fluid is conducted through conductors 62 and 63. The lower end of the piston is pivotally attached to an extending boss 64 on the slide 54. A pair of adjustable stop elements 65 and 66 are carried by the standard 22 to project into the path of the operating arm 67 of the valve 61. When the slide 51 is moved downwardly by the rod 47, the slide 54 is carried downwardly therewith through the connection provided by the cylinder supporting head 52, the cylinder 53, the rod 57 and the boss 64. Near the end of the broaching operation the valve arm 67 engages the lower element 66 and is moved to operate the valve and reverse the flow of fluid in the cylinder 53 to thereby draw the slide 54 upwardly. The upward movement of the slide 51 on the sloping cam tracks 55 moves the slide 51 rearwardly within the slide 54. Thereafter the movement of the slides 51 and 54 as a unit is reversed during which movement the teeth 29 of the broach 24 are out of engagement with the teeth of the gear blank which was machined.

Near the end of the retrieving movement the valve arm 67 strikes the upper element 65 to reverse the flow of fluid in the cylinder 53 to produce the extension of the rod 57 into the position illustrated to thereby move the slide 51 outwardly to have the broaching teeth 29 disposed in a position to engage the periphery of the blank which is to be machined. A slide 68, similar to slide 35 of Figs. 1 to 4, is mounted on the base 21 of the machine for movement laterally thereacross. The slide is provided with a rotatable shaft 39 for receiving a gear to be machined and a stud 70 upon which a master gear 69 is mounted for rotary movement. A rack 71 is mounted on the base 21 of the machine, having the teeth thereof in mesh with the teeth of the master gear 69. The rack 71 is mounted in ways to permit movement rearwardly of the slide to move the teeth of the rack out of engagement with those of the master gear.

The rack is provided with a sloping surface 90 and is urged by a spring 93 against the sloping surface of a wedge 94, the position of which is controlled by a piston 95 of a cylinder 96 mounted on the base of the machine. Flexible conductors 97 and 98 join with the conductors 58 and 59 respectively which are associated with the cylinder 53. When the cylinder 53 is energized to have the piston rod 57 move upwardly fluid will be introduced into the conduit 97 to have the wedge 94 move to the right to permit the rack 71 to be moved rearwardly by the spring 93, out of mesh with the teeth of the master gear 69. When the broach has been moved outwardly at the end of its upward stroke into cutting position by the downward movement of the piston 57, fluid will enter the cylinder 96 through the conduit 98 to move the piston 95 to the left, as viewed in the figure, to move the teeth of the rack 71 into mesh with the teeth of the master gear 69.

The slideable rack 72 is mounted in ways 73 in the front portion of the base 21 with the teeth thereof engaging the teeth of the master gear 69 at a point diametrically opposite to the engagement of the teeth with those of the rack 71. The teeth of the rack 72 also engage the teeth of a master sector 74 fixed to the rotatable shaft 39 of the slide 68 on which the gear blank 75 is secured by the nut 45. As the slide 68 is moved to the right, as viewed in Fig. 5, during the downward movement of the slide 51, the master gear 69 is rotated counter-clockwise, moving the rack 72 to the right, which movement rotates the master sector 74 and the gear blank 75 also in a counter-clockwise direction. This movement of the slide 68 rolls the peripheral edge of the gear blank across the broach teeth as the teeth are moving downwardly across the periphery of the blank. This compound movement of the blank and broach, generates involute teeth on the gear blank while the master gear, sector, and racks retain the proper index of the blank relative to the broach teeth.

After each stroke of the slide 51, the broach and rack 71 are moved rearwardly out of engagement with the blank and master gear 69, respectively, so that during the return movement of the slides 51 and 54, the slide 68 and rack 72 may be shifted to the left to their initial positions without changing the relation of the sector 74, master gear 69 or blank 75 with each other. This positions the blank relative to the broach at the point at which the machining operation terminated at the end of the prior stroke of the broach. As the slides 51 and 54 reach the end of the return stroke, the broach and the rack 71 are moved outwardly to have the teeth thereof positioned to engage, respectively, the peripheral edge of the blank and the teeth of the master gear 69. This cycle of operation is continued until one-half of the teeth have been cut in the blank, after which the blank is removed and replaced on the shaft 39 in a position 180 degrees from the original position and all the parts, including the rack 72, and sector 74, are returned to their initial position and the cycle continued until the remaining half of the blank has teeth broached therein as above described.

In Figs. 8 and 9, I have illustrated a further form of my invention, wherein the laterally movable slide 68 of Figs. 5, 6, and 7, is omitted and a carriage 77 substituted therefor. The carriage operated in ways 78 disposed at the top and bottom of the base 21 and supports a shaft 79, the upper end of which is secured to the blank 75 to be machined. The opposite end of the shaft carries a master gear 81 of the same size, and having the same characteristics, as that of the gear to be finished from the blank 75. The teeth of the gear 81 mesh with the teeth of a rack 82, which rack and gear are disposed below the end of the slide 51 when the slide reaches the bottom of its stroke. The use of a master gear 81 in place of the sector 74, eliminates the necessity of turning the gear blank 75 through 180 degrees as occurs with the use of the sector 74 illustrated in Figs. 5, 6, and 7.

With the structure just described, it is possible to machine all of the teeth of a blank in a single operation of a broach when the broach is of sufficient length relative to the diameter of the blank to pass over the entire periphery thereof in a single stroke. While in the machine illustrated, only a few of the blank teeth are machined during a single reciprocation of the slide, requiring the shifting of the carriage 77 to the left, after each stroke, as illustrated and described relative to the slide 69 of the structure illustrated in Figs. 5 to 7, it is to be understood that by lengthening cam groove 25 and the rack 71 all of the blank teeth may be machined during a single movement of the broach, as pointed out hereinabove. It may be desirable to mount the cam 25 outside of the frame of the machine so that the entire surface of the slide 51 may be utilized as a support for the broaching teeth.

In Figs. 10, 11, and 12, I have illustrated a further form of my invention, wherein the tool is retained stationary and the gear is moved thereacross. A carriage 84 operates on ways 85 on the base 86 of the machine, actuated by the piston rod 49 from a cylinder 48. The carriage 84 supports the slide 68 which is operated by the cam slot 25, laterally of the movement of the carriage. The slide carries the gear blank 75 to be machined and is provided with the racks 71 and 72, master gear 69 and master sector 74, referred to hereinabove with regard to the structure illustrated in Figs. 5 to 7 inclusive. The broach 24 is secured to the base of the machine in the path of the master gear and through the movement of the carriage 84 longitudinally of the broach, the rolling of the blank thereacross occurs in a similar manner as that explained hereinabove.

At the end of the stroke of the carriage 84 a cylinder 87 is energized to effect the movement of the broach slide 88 toward the left as viewed in Fig. 11. This movement on the cam tracks 55 withdraws the teeth of the broach from contact with the gear blank to permit the return movement of the frame 84 with the periphery of the blank out of contact with the teeth of the broach as explained above. During this movement, the rack 71 having moved out of contact with the master gear 69 permits the movement of the slide 68, rack 72, master gear 69, and blank 75 to the left, as viewed in the figure, to index the blank relative to the broach. After the return of the carriage to its original position and after the elements have been indexed the rack 71 is again moved into mesh with the master gear 69 and the cylinder 87 is energized to return the slide 88 to its original position to move the teeth of the broach outwardly into a position of engagement with the peripheral edge of the blank 75.

After one-half of the periphery of the blank has been machined, the blank is removed and turned through 180 degrees and replaced upon the rotatable shaft 39. Thereafter, the operation is continued until the remaining half of the peripheral edge of the blank has been machined. It is to be understood that the carriage 84 may be elongated to be similar to the carriage 77 employed in the structure illustrated in Figs. 8 and 9 so as to eliminate the use of the sector 74 and to permit the use of a master gear 81 to thereby eliminate the necessity of turning the gear through 180 degrees. This permits the entire periphery of the blank to be machined in a single operation when the diameter of the blank is in correct proportion to the length of the broach. The machine thus described is of the horizontal type but it is to be understood that the same arrangement may be employed in a vertical type of machine.

In Fig. 13 I have shown a form of device similar to that illustrated in Figs. 10, 11 and 12, with the exception that the carriage 84 when moved on the base 86 carries the roller 38 in the slot 25 of the slide 89, to move the slide laterally of the frame. The broach 24 on the slide passes across the gear blank which is rotated by the racks 71 and 72 master gear 69, and gear sector 74, as explained hereinabove. However, in the present arrangement, rack 71 carries a pin 99 which operates in a slot 102 so that the rack 71 is moved laterally with the slide 89 to thereby rotate the master gear 69 and the gear blank 75. Accordingly, through the movement of the carriage 84, the gear blank is rolled relative to the broach 24 which is moved laterally across the blank as the blank is progressively advanced over the rack. The blank and rack are preferably so related that half of the teeth of the blank are cut during a single stroke of the carriage 84 so that the gear may be removed and the carriage returned to its initial position. Thereafter the gear is mounted on the carriage 180 degrees from its original position to have the remaining peripheral edge of the blank machined during the next movement of the carriage relative to the broach.

When additional strokes of the broach are required to machine half the periphery of the blank, means may be provided, similar to those hereinabove referred to, for moving the rack out of contact with the gear blank on the return stroke of the carriage and for moving the rack 71 out of engagement with the teeth of the master gear to permit the shifting of the rack 71 back to its initial position without turning the master gear 69. At the end of the return stroke the rack is again moved outwardly to a position to engage the peripheral edge of the blank and the rack 71 is again moved into meshed relation with the teeth of the master gear 69. When the rack is of sufficient length to machine the entire peripheral edge of the gear blank, the carriage 84 may be extended to be similar to carriage 77, referred to above with relation to the structure illustrated in Figs. 8 and 9, so that a complete master gear 81 may be employed in place of sector 74. The machine illustrated in Fig. 13 is of the horizontal type but it is to be understood that the same principles of operation may be employed on a vertical type of machine.

In Fig. 14, I have shown a further form of my invention, wherein the rack is moved lengthwise as well as laterally to effect the machining operation. In this arrangement the gear blank 75 is retained in fixed relation relative to the rack and is rolled by the employment of master gears, sectors, and racks, in the same manner as that referred to in regard to the structure illustrated in Fig. 13. A cross frame 92 is fixed to the base 86 and has mounted thereon the racks 71 and 72, the master gear 69, the sector 74, and the gear blank 75 to be machined. The rack 71 has a stud 99 on the rear thereof which engages a slot 102 in the slide 89. When the cylinder 48 has fluid introduced therein to move the piston outwardly thereof, a piston rod 47 moves a frame 91 and a slide 89 lengthwise of the base. This movement causes the slide 89 to move laterally of the frame 91 through the engagement of roller 38 on the cross frame 92 in the slot 25 of the slide. The rack 24 is carried longitudinally and laterally of the frame and produces the rotation of the blank 75 to produce a rolling motion of the blank edge relative to the teeth of the rack, as the rack advances laterally and longitudinally of the blank.

At the completion of the stroke of the rack, the blank 75 is removed, the frame 81 is returned to its initial position and the gear blank 75 is remounted to have the peripheral edge changed 180 degrees from that in which it was originally positioned so that the remaining half of its peripheral edge will be machined on the next stroke of the frame 91. Such machining is possible if the diameter of the blank relative to the length of the broach is such that one half of the peripheral edge of the blank is machined during one stroke of frame 91. When additional strokes of the frame are required to machine one half of the peripheral edge of the blank it is necessary to provide means for dropping the broach out of a position of engagement with the peripheral edge of the blank to permit the return stroke of the broach and for disconnecting the rack 71 from the master gear 69 to permit the rack to be returned to its initial position without turning the master gear 69. At the end of the return stroke of the frame 91 the rack is moved outwardly to a position of engagement with the peripheral edge of the blank 75 and the rack 71 is again moved into mesh with the teeth of master gear 69.

When the length of the rack is such as to be capable of machining the entire peripheral edge of the blank 75 in a single stroke of the frame 91, the cross frame 92 is lengthened to be similar in length to the carriage 77 to have the master gear 81 beyond the end of the frame 91 when entirely advanced. This permits the use of a master gear 81 in place of the sector 74 so that during a single stroke of the frame 91 the entire peripheral edge of the blank 75 is machined. While the machine illustrated is that of the horizontal type, it is to be understood that the same principles of operation may be employed on a vertical type of machine.

While I have described and illustrated several embodiments of my invention, which apply specifically to the broaching of gears through a generating operation, it will be apparent to those skilled in the art, that various changes, omissions, additions and substitutions may be made therein without departing from the spirit and scope of my invention, as set forth in the accompanying claims.

What I claim is:

1. In a machine for broaching teeth on a gear, the combination with a base, a broach having teeth thereon for generating teeth on a gear blank when rolled thereacross, means for mounting a gear blank relative to the broach, means synchronized with the broach for rolling the blank across the teeth thereof during the stroke of the broach, for machining a portion of the teeth thereon, means for moving the broach out of the path of engagement with the edge of the blank, means for returning the broach to its initial position, and means for returning the blank to its initial position while retaining it against a rotational movement, means for returning the broach into the path of engagement with the edge of the blank, whereby after a number of strokes of the broach the entire peripheral edge of the blank has been machined.

2. In a machine for broaching teeth on a gear, the combination with a base, two slides movable thereon normal to each other, broaching blades on one slide, a gear blank on another slide, interconnecting means for driving the slides in synchronism, means on said blank slide for producing the rotation of the blank as the slide is shifted to roll the blank edge across the broach teeth, and means for moving the broach teeth out of the path of engagement with the blades and disconnecting the means for rotating the blank so that both slides may be returned to their initial position to have the blank indexed relative to the broach to have further teeth cut thereon during a subsequent broaching stroke.

3. In a machine for broaching teeth on a gear, the combination with a base, two slides thereon movable normal to each other, a plurality of sets of like broaching teeth disposed in eschelon relation on one slide, cam means interconnecting the slides so that the driving of one produces the movement of the other, a rotatable shaft on the blank slide, a gear sector fixed to said shaft, a pinion carried by said slide for engaging said sector, a rack on said base engaging the teeth of the pinion, and a gear element to be machined fixed to said rotatable shaft and driven by said sector, through the engagement of the pinion with the rack, when the slide is shifted to roll the peripheral edge of the blank across the broaching teeth during the broaching stroke.

4. In a machine for broaching teeth on a gear, the combination with a base, two slides movable thereon normal to each other, broaching blades on one slide, a gear blank mounted on a rotatable shaft on the other slide, a toothed element on said shaft, a slidable rack engaging said toothed element, a master gear rotatably mounted on said slide engageable with said rack, a second rack supported on said base engaging the opposite side of said master gear, and interconnecting means between the broaching teeth slide and the blank slide for producing the interrelated movement of the slides when one is moved, whereby the said second rack rotates the master gear to shift the first said rack to operate the toothed element to rotate the gear blank to produce the rolling of the edge thereof across the broaching teeth during the broaching stroke.

5. In a machine for broaching teeth on a gear, the combination with a base, two slides movable thereon normal to each other, broaching blades on one slide, a gear blank mounted on a rotatable shaft on the other slide, a toothed element on said shaft, a slidable rack engaging said toothed element, a master gear rotatably mounted on said slide engageable with said rack, a second rack supported on said base engaging the opposite side of said master gear, interconnecting means between the broaching teeth slide and the blank slide for producing the interrelated movement of the slides when one is moved, whereby the said second rack rotates the master gear to shift the first said rack to operate the toothed element to rotate the gear blank to produce the rolling of the edge thereof across the broaching teeth during the broaching stroke, means for shifting the broach slide out of the path of engagement with the gear blank to prevent interference during the return stroke of the broaching teeth, and means for moving the second rack out of engagement with the master gear to permit the shifting of the blank slide to its initial position without rotating the blank.

6. In a machine for broaching teeth on a gear, the combination with a base, two slides movable thereon normal to each other, broaching blades on one slide, a gear blank mounted on a rotatable shaft on the other slide, a toothed element on said shaft, a slidable rack engaging said toothed element, a master gear rotatably mounted on said slide engageable with said rack, a second rack supported on said base engaging the opposite side of said master gear, interconnecting means between the broaching teeth slide and the blank slide for producing the interrelated movement of the slides when one is moved, whereby the said second rack rotates the master gear to shift the first said rack to operate the toothed element to rotate the gear blank to produce the rolling of the edge thereof across the broaching teeth during the broaching stroke, means for shifting the broach slide out of the path of engagement with the gear blank to prevent interference during the return stroke of the broaching teeth, means for moving the second rack out of engagement with the master gear to permit the shifting of the blank slide to its initial position without rotating the blank, and means for moving the broaching teeth into the path of engagement with the blank at the end of the return stroke and for again engaging the teeth of the second rack with the master gear to machine additional teeth on the periphery of the blank during the subsequent stroke of the broaching teeth.

JOHN D. ROVICK.